United States Patent [19]

Kawamura et al.

[11] Patent Number: 4,980,772
[45] Date of Patent: Dec. 25, 1990

[54] IMAGE PICKUP DEVICE INCORPORATED WITH IMAGE INTENSIFIER TUBE

[75] Inventors: Tatsuro Kawamura; Humihiko Ando; Masayuki Sugawara; Takashi Ando, all of Tokyo; Masumi Tachino, Shizuoka; Yasushi Watase, Shizuoka; Toshio Ikuma, Shizuoka; Kazumasa Kato, Shizuoka, all of Japan

[73] Assignees: Hamamatsu Photonics Kabushiki Kaisha, Shizuoka; Nippon Hoso Kyokai, Tokyo, both of Japan

[21] Appl. No.: 353,275

[22] Filed: May 17, 1989

[30] Foreign Application Priority Data

May 17, 1988 [JP] Japan .................. 63-120178

[51] Int. Cl.$^5$ ............................. H04N 5/30
[52] U.S. Cl. .................... 358/217; 358/211
[58] Field of Search ............ 358/217–219, 358/211, 209, 110–111, 213.11

[56] References Cited

U.S. PATENT DOCUMENTS

| | | | |
|---|---|---|---|
| 3,864,594 | 2/1975 | Svensson | 315/10 |
| 4,365,269 | 12/1982 | Haendle | 358/211 |
| 4,471,378 | 9/1984 | Ng | 358/217 |
| 4,611,920 | 9/1986 | Tsuchiya | 358/211 |
| 4,672,454 | 6/1987 | Cannella et al. | 358/213.11 |
| 4,704,634 | 11/1987 | Kato et al. | 358/217 |
| 4,727,427 | 2/1988 | Kime | 358/217 |

FOREIGN PATENT DOCUMENTS 0187087 7/1986 European Pat. Off. .

OTHER PUBLICATIONS

Kawamura, T., et al., "Improvement in Persistence Characteristics of Proximity Image Intensifiers", NHK Laboratories Note, Ser. No. 333, pp. 2–13, published Jul., 1986.

Primary Examiner—Stephen Brinich
Attorney, Agent, or Firm—Finnegan, Henderson, Farabow, Garrett, & Dunner

[57] ABSTRACT

An image intensifier tube and a solid-state image pickup device are combined to form a unified image pickup device. A thin fiber plate with thickness of 0.5–1.5 mm is interposed between a phosphor layer of the image intensifier tube and a photosensitive layer of the solid-state image pickup device. A microchannel plate may be incorporated to multiply photoelectrons emitted from a photocathode.

10 Claims, 4 Drawing Sheets

IMAGE PICKUP DEVICE INCORPORATED WITH IMAGE INTENSIFIER TUBE

BACKGROUND OF THE INVENTION

The present invention relates to image sensors such as image pickup devices for use in television cameras. In particular, the present invention relates to an image pickup device of high sensitivity that is capable of picking up an image of a very dark object through electron image intensification.

Various proposals have been made to increase the sensitivity of image pickup devices and one approach consists of placing an image intensifier tube (hereinafter abbreviated as an I.I. tube) in front of the photosensitive surface of an image pickup device. The key concept of this design is that an image of an object is made much brighter by means of the I.I. tube and used as an input image for the image pickup device, thereby increasing the sensitivity of the device. To attain the intended result, the output image from the I.I. tube must be transmitted correctly to the photosensitive surface of the image pickup device. To meet this need, it is common practice to attach a fiber plate both to the output face of the I.I. tube and to the input face of the image pickup device.

FIG. 6 shows the construction of a color television camera in which an electric field (focusing) type I.I. tube 13 is coupled to a photoconductive storage camera tube (e.g. Saticon) 15 using a fiber plate 12a as a light-receiving surface, and this camera has proved to be 10-15 times as sensitive as ordinary color television Cameras (see Ohnishi and Yamashita, NHK Giken Gepppo, Vol. 24, No. 1, 1981). The other components of the camera shown in FIG. 6 are as follows: 2, a photocathode; 9, an electrode; 10, an insulator; 12b and 12c, a concave fiber plate each; 11, a fluorescent screen; and 14, a photoconductive surface. An I.I. tube has been coupled to other photoconductive camera tubes which employ different materials in the photosensitive layer than in Saticon, such as Chalnicon (see Inoue and Aihara, "Image Picking-up Characteristics of Chalnicon with Image Intensifier," Preprint 2—2 for the 1984 Annual Meeting of the Institute of Television Engineers of Japan) and Newvicon (see Yamamoto, "Newvicon with Fiber Plates," National Technical Report, Vol. 25, No. 2, 1979).

FIG. 7 shows an example of the case in which not only high sensitivity but also size reduction and elimination of image distortion could be realized by using a proximity (focusing) type I.I. tube 16 (see Kawamura and Yanagisawa, "Development of Proximity Photocathode Technology and Its Application to Image Intensifiers," the Journal of the Institute of Television Engineers of Japan, Vol. 36, No. 3, 1982). Other components of the system shown in FIG. 7 are as follows: 12d, a fiber plate; 1, a faceplate; 3, an anti-reflection layer; 4, a metal-back layer; 5, a phosphor layer. The members 3, 4 and 5 combine to form a fluorescent screen 11. The other components which are the same as those shown in FIG. 6 are identified by like numerals.

If further enhancement of sensitivity is required, a plurality of I.I. tubes may be cascade-connected or a MCP (microchannel plate) may be incorporated in an I.I. tube to intensify the electron image.

A potential application of these techniques is in the effort to increase the sensitivity of solid-state image pickup devices. An example of this effort is shown in FIG. 8 and consists of coupling an I.I. tube 16 to a fiber plate 12a which is closely attached to the front face of the photosensitive layer 7 of a solid-state image pickup device 8. Instead of the I.I. tube 16, an electric field type I.I. tube as indicated by 13 in FIG. 6 may be coupled to the solid-state image pickup device 8. However, in order to fully exploit the small size and non-distortion feature of solid-state image pickup devices, it is more convenient to use the distortion-free proximity type I.I. tube 16 rather than the electric field type I.I. tube 13 which is prone to image distortion. Shown by 8a in FIG. 8 is a package for the solid-state image pickup device 8.

A version similar to that envisaged by the present invention is shown in FIG. 9, in which a solid-state image pickup device 8 such as CCD is sealed within an image tube 13 having a photocathode 2. Being named ICCD (intensidifed charge-coupled device), this system has claimed a sensitivity increased by a factor of 2,500 under an acceleration voltage of 20 kV but has not yet emerged from the laboratory (see J. L. Lowrance et al., "ICCD Development at Princeton," Adv. E.E.P., Vol. 52, pp. 441-452, 1979).

As described above, the prior art techniques for enhancing the sensitivity of image pickup devices through addition of I.I. tubes are not effective unless the focused output image on the I.I. tube is transmitted by some method to the photosensitive surface of an image pickup device in an optically correct manner. To meet this mandatory requirement, at least two fiber plates have been necessary as basic means for coupling an I.I. tube to an image pickup device. They are the fiber plate 12c or 12d on the output side of the I.I. tube 13 or 16 and the fiber plate 12a on the input side of the image pickup device 15 or 8 (see FIGS. 6, 7 and 8). The use of these fiber plates 12a, 12c and 12d will eventually cause severe deterioration in quality of an output image which is dependent on the characteristics of the fiber plates. The fiber plate is composed of a bundle of optical glass fibers that are worked into a plate form. The fiber plate has the advantage of permitting an optical image on the input surface to be transmitted to the output surface with minimum optical loss but, at the same time, it has the following disadvantages.

(1) Despite comparatively low optical loss, fiber plates with the usual thickness of 5-10 mm do not have a transmittance exceeding about 70%, so the overall transmittance of two fiber plates is about 50%, thus reducing the image intensification of the system by one half.

(2) Image transmission through a fiber plate involves sampling by individual optical fibers and this leads to deteriorated image resolution. A combination of two fiber plates will cause another problem, namely, image interference such as beat or moire.

(3) Fiber plates suffer from several optical defects that are introduced during fabrication and to name a few: failure to transmit light on account of breakage or devitrification of individual fibers; flaws due to uneven distribution of absorbers that are inherent in fiber structure; nonuniformities called "block lines" or "chicken wires" that are introduced when a plurality of multifibers, each including a certain number of fibers, are further bundled together; distortions caused by twisting or shifting of multi-fibers; and shading which occurs on account of the difference in transmittance between individual multi-fibers. These many optical defects are unwanted since they all deteriorate the quality of output image.

(4) These optical defects could be avoided to some extent by selecting fiber plates of good quality, but then such fiber plates are very expensive since their production yield is low.

Thus, the conventional techniques for increasing the sensitivity of image pickup devices by coupling them with I.I. tubes via fiber plates have suffered from the defects inherent in fiber plates and the biggest problem with the prior art has been how to prevent image deterioration that would otherwise result from sensitivity loss, reduced resolution, and flaws or nonuniformities on the screen.

With a view to solving this problem, the present inventors previously conducted an experiment making an attempt to eliminate one fiber plate by bonding the fiber plate 12d on the output surface of an I.I. tube 16 (see FIG. 10) to a solid-state image pickup device 8 by means of an adhesive. This technique proved to be more effective in improving image quality than the previous methods of using two fiber plates 12a and 12d as shown in FIGS. 7 and 8, but the results were still unsatisfactory. Furthermore, this approach is not recommendable from the viewpoint of workmanship if a camera tube is to be used as the image pickup device.

The system shown in FIG. 9 is a refinement of this approach, in which a solid-state image pickup device 8 such as CCD is sealed within an image tube 13 having a photocathode 2. Unfortunately, however, this improved version has not yet been commercialized, possibly for the following reason: The alkali metals, which were used in forming the photocathode with the image tube 13 being evacuated, will deposit on the photosensitive surface 7 of the CCD enclosed with the image tube 13, and this will either cause an immediate drop in resolution or slowly deteriorate the performance of the CCD. Thus, the operating life of the system may be long enough to enable acquisition of experimental data but is too short to guarantee its commercial use.

SUMMARY OF THE INVENTION

An object, therefore, of the present invention is to provide a highly-sensitive and easy-to-operate image pickup device of a type that has an image instensifier (I.I.) tube coupled to a solid-state image pickup device to form a unified structure. More specifically, the present invention aims at minimizing fiber-plate-induced image deterioration by using a very thin fiber plate (0.5-1.5 mm), and also preventing alkali metals from being deposited on the photo-sensitive surface of a solid-state image pickup device that is confined within an I.I. tube.

This object of the present invention can generally be attained by an image pickup device with an I.I. tube that consists basically of a photocathode section having a photocathode and a fluorescent screen section having a phosphor layer combined with a solid-state image pickup device. More specifically, the present invention attains the above-stated objects by ensuring that said phosphor layer for said I.I. tube is placed on said solid-state image pickup device with a thin fiber plate being interposed.

In accordance with the present invention, the image of an object is focused on the photocathode of the photocathode section, which then emits photoelectrons in proportion to the brightness distribution of the input image. The emitted photoelectrons are accelerated by high dc voltage to travel over the very short distance from the photocathode section to the fluorescent screen section, and the thus "proximity focused" photoelectrons will strike the phosphor layer to excite the phosphor for light emission.

The image that has been made much brighter in the phosphor layer passes through the thin fiber plate to be launched into the photosensitive layer of the solid-state image pickup device, which then operates to yield an output video signal. Thus, the image rendered much brighter in the phosphor layer can be transmitted to the solid-state image pickup device with minimum loss, and image deterioration that would otherwise occur if fiber plates were used can be sufficiently reduced to insure significant increase in the sensitivity of the image pickup device.

Other and further objects, features and advantages will appear more fully from the following description taken in connection with the accompanying drawings.

DETAILED DESCRIPTION OF THE INVENTION

Several embodiments of the present invention are described hereinafter with reference to FIGS. 1–5.

Figure 1:
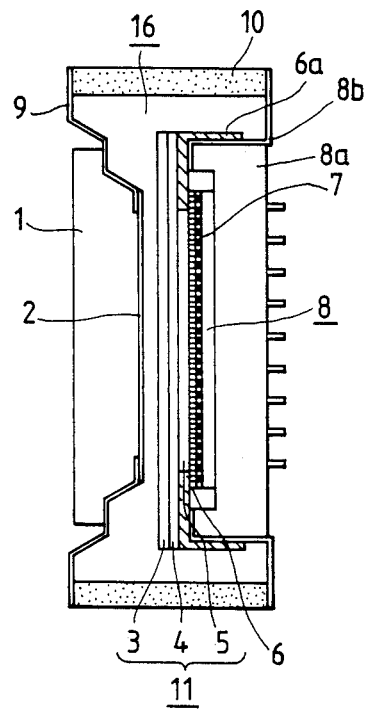
FIG. 1 shows the construction of an image pickup device according to a first embodiment of the present invention.

The basic concept of the present invention and a first embodiment thereof are shown in FIG. 1. One can see from this figure that the image pickup device of the present invention differs from prior art systems in that the thick fiber plate 12a is replaced by a very thin (0.5-1.5 mm) fiber plate 6 and bonded to a solid-state image pickup device 8, whereby the device 8 is made integral with an I.I. tube 16 to fabricate an I.I. type solid-state image pickup device.

The construction of the image pickup device shown in FIG. 1 is described below more specifically with reference to FIG. 1. One of the major features of the present invention lies in securely fastening a very thin fiber plate 6 (0.5-1.5 mm) to the photosensitive layer 7 of the solid-state image pickup device 8. If an adhesive is used as a fastening means, it will cause adverse effects by being deposited on a fluorescent screen 11 and other areas when the image pickup device 8 is sealed in the I.I. tube 16. According to the present invention, the thin fiber plate 6 is compressed on its periphery by means of a metal cap 6a, which is welded to the flange 8b of a package 8a of the image pickup device 8, thus allowing the fiber plate 6 to be fixed in close contact with the image pickup device 8. Some gap might form between the fiber plate 6 and the photosensitive layer 7 on the image pickup device 8, but this will not be a problem as long as the image pickup device side of the fiber plate 6 has an adequately smoothed surface. A phosphor layer 5 is then formed on the other surface of the fiber plate 6 and further overlaid with a metal-back layer 4, which insures that light emitted from the phosphor layer 5 will not return to the photocathode 2. The metal-back layer 4 is desirably coated with an anti-reflection layer 3 so as to reduce flare that might occur when incident light transmitted through the photocathode 2 is reflected from the metal-back layer 4 to return to the photocathode 2. The phosphor layer 5, metal-back layer 4 and anti-reflection layer 3 combine to form the fluorescent screen 11. If necessary, an optical filter layer (not shown) that provides matching between the emission spectrum characteristics of the phosphor layer 5 and the spectral characteristics of the photosensitive layer 7 of the image pickup device 8 may be disposed between the thin fiber plate 6 and the fluorescent screen 11, and this is also a preferred embodiment of the present invention.

Both the metal-back layer 4 and the anti-reflection layer 3 may be formed by well-known techniques; the former may be deposited by evaporation of aluminum under high vacuum, whereas the latter may be deposited by evaporation of aluminum under low vacuum in an argon gas atmosphere.

Thus, the image pickup device shown in FIG. 1 is constructed in such a way that a unit consisting of the solid-state image pickup device 8, the fluorescent screen section 11, and the thin fiber plate 6 being interposed therebetween is used as a substitute for the fluorescent screen of an ordinary I.I. tube, and the photocathode 2 is formed with the interior of the proximity type I.I. tube 16 being evacuated, followed by vacuum sealing of the latter to fabricate an I.I. type solid-state image pickup device. The photocathode of a proximity type I.I. tube can be readily fabricated by adopting the proximity focusing type photocathode fabricating technique that has already been developed by the present inventors (see Japanese Patent Publication No. 35411/1978).

The operation of the image pickup device shown in FIG. 1 will proceed as follows. The image of the object is focused on the photocathode 2, which emits photoelectrons in proportion to the brightness of distribution the input image. The emitted photoelectrons are accelerated by high dc voltage to travel over the very short distance from the photocathode 2 to the fluorescent screen 11, and the thus "proximity focused" photoelectrons are transmitted through the anti-reflection layer 3 and the metal-back layer 4 to strike the phosphor layer 5 to excite the phosphor for light emission.

The image that has been rendered much brighter in the phosphor layer 5 is transmitted through the thin fiber plate 6 to reach the photosensitive layer 7 on the solid-state image pickup device 8, which then operates to yield an output video signal. Thus, the image rendered much brighter in the phosphor layer 5 can be transmitted to the solid-state image pickup device 8 with minimum loss, and therefore image deterioration that would otherwise occur if two fiber plates were used can be sufficiently reduced and higher sensitivity of the image pickup device can be attained.

Figure 2:
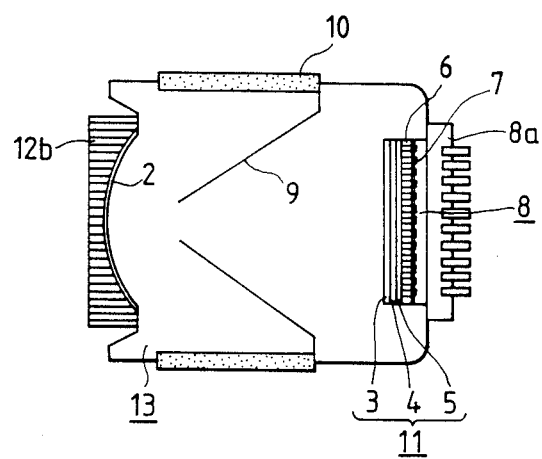
FIG. 2 shows the construction of an image pickup device according to a second embodiment of the present invention.

A second embodiment of the present invention which is shown in FIG. 2 is characterized by the combination of a field focusing type I.I. tube 13 with the solid-state image pickup device 8. An electric field type I.I. tube has the inherent disadvantage that image distortion in the marginal region is unavoidable, so it would not be advisable to combine this type of I.I. tube with the solid-stage image pickup device 8 having a non-distortion feature. Furthermore, this particular combination requires an unduly large equipment size. Nevertheless, the second embodiment of the present invention has the advantage that it is easier to fabricate than the first embodiment. Another point that should be noted about the second embodiment is that in order to alleviate image distortion, a concave fiber plate 12b is used as the input surface of the I.I. tube 13 but this will, in turn, cause pronounced deterioration in image quality. If the concave fiber plate 12b were replaced by a planar glass faceplate, the commercial value of the system would be further reduced on account of increased image distortion but, on the other hand, better image quality will be attained.

Figure 3:
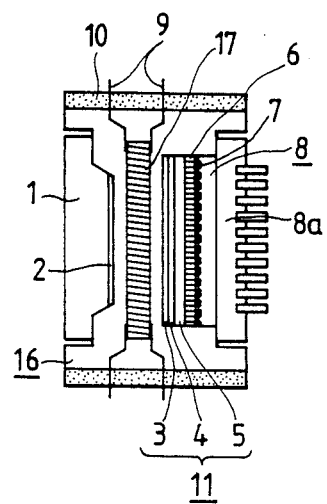
FIG. 3 and 4 show the constructions of an image pickup devices according to a third embodiment of the present invention.
Figure 4:
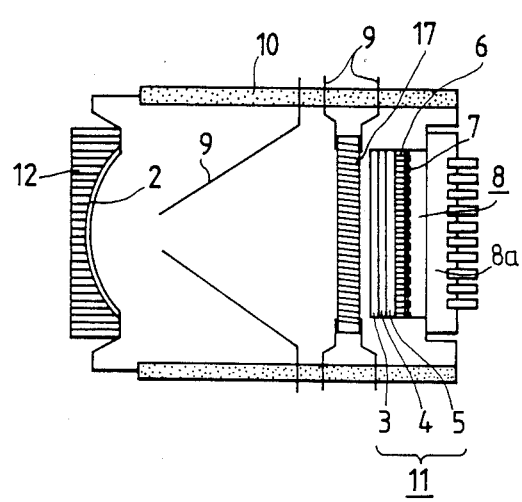

FIGS. 3 and 4 show a third embodiment of the present invention in which a microchannel plate 17 (hereinafter abbreviated as MCP) which is known as a two-dimensional image intensifying device is inserted into the I.I. type solid-state imaging device to insure ultra high sensitivity. FIG. 3 shows an example in which MCP 17 is inserted between the photocathode 2 and fluorescent screen 11 of the proximity type I.I. tube 16 shown in FIG. 1, whereas FIG. 4 shows an example in which MCP 17 is inserted between the photocathode surface 2 and fluorescent screen 11 of the electric field type I.I. tube 13 shown in FIG. 2. Of these two examples, the case of using the proximity type I.I. tube 16 as in FIG. 3 is preferred if one needs to consider image distortion. The factor of multiplication by MCP 17 is variable with the voltage applied between its input and output terminals. Generally speaking, 1,000 volts will provide a multiplication factor of about 10,000 and, with this value combined with the amplification of brightness by the phosphor layer 5, the insertion of MCP 17 will create an ultra-high-sensitivity device that ensures image intensification by a factor not lower than several tens of thousands.

Figure 5:
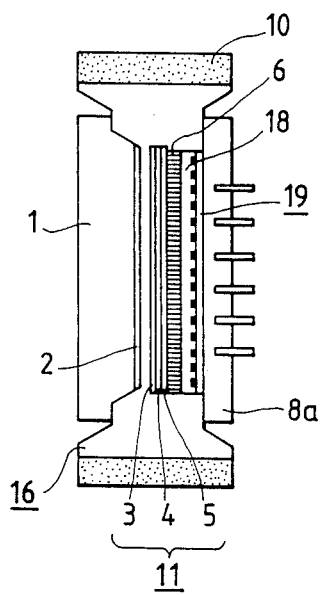
FIG. 5 shows the construction of an image pickup device according to a forth embodiment of the present invention.
Figure 6:
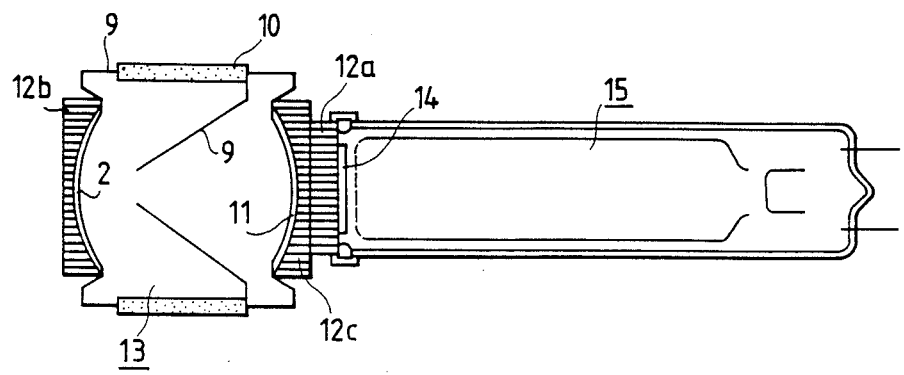
FIGS. 6–10 show the constructions of prior art image pickup devices.
Figure 7:
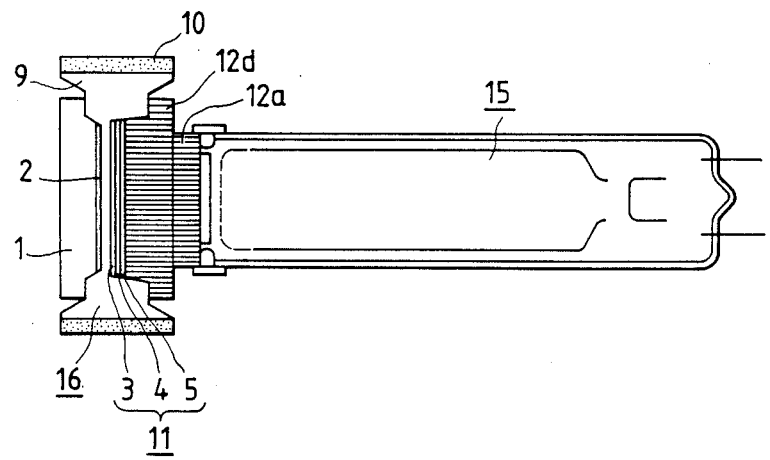
Figure 8:
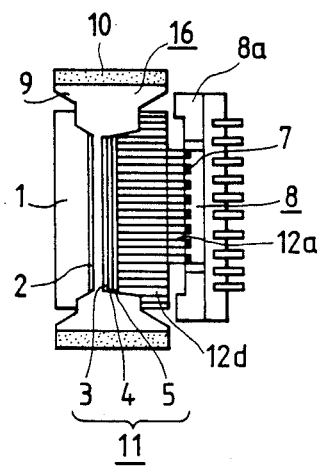
Figure 10:
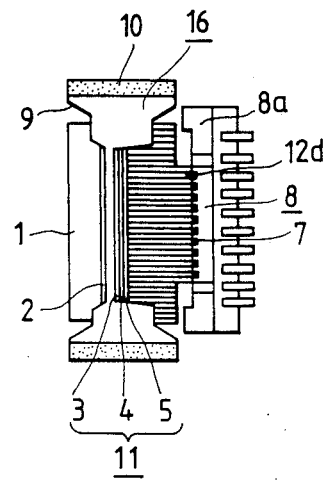
Figure 9:
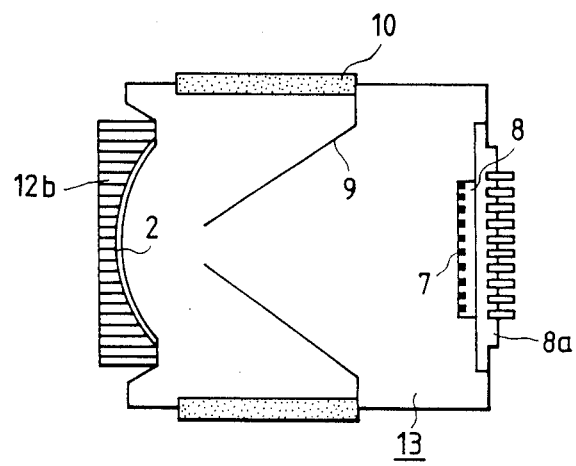

A fourth embodiment of the present invention is shown in FIG. 5 and is characterized by combining an I.I. tube with a so-called "layered type" solid-state image pickup device 19 which has a layer of a photoconductive material 18 such as amorphous silicon that is superposed on a solid-state device having a scanning capability.

The major reason for the image deterioration that has occurred in the prior art is the use of at least two thick fiber plates as means for coupling an I.I. tube to a solid-state image pickup device. In accordance with the present invention, a solid-state image pickup device is coupled to a fluorescent screen via a fiber plate of minimum thickness and then confined within an I.I. tube so as to minimize possible image deterioration. The fiber plate has the added advantage of preventing adverse effects that would otherwise be caused by deterioration of device characteristics due to the deposition of alkali metals on photosensitive surface when a photocathode is formed and subsequently the photosensitive surface coexists with the photocathode under vacuum. This fiber plate has such a small thickness that the following advantages will result:

(1) the loss due to optical transmittance of the fiber plate is reduced to a practically negligible level, so that the increase in the brightness of image that has been achieved by the I.I. tube can be fully utilized without loss;

(2) image interferences such as beat and moire can be eliminated;

(3) because of the thinness of the fiber plate, nonuniformities that result from fixed patterns such as multifibers and absorbers that are inherent in the structure of the fiber plate, defects and nonuniformities that would be caused by breakage and devitrification of individual fibers, as well as shading due to the difference in transmittance between multi-fibers are sufficiently reduced to achieve marked improvement in the quality of finally produced image;

(4) the absence of thick fiber plates contributes to a higher production yield and hence improved economy; and (5) since an optical image that has been rendered much brighter in the phosphor layer is used as an input image for the solid-state image pickup device, the brightness saturation of the phosphor comes into play and proves effective in preventing blooming, smear and other unwanted phenomena in the solid-state image pickup device even if the incident light is most intense as in a "highlight."

What is claimed is:

1. An image pickup device incorporated with an image intensifier tube, comprising:
   a photocathode section comprising a photocathode for emitting photoelectrons in response to an input optical image of an object;
   a fluorescent screen section comprising a phosphor layer for converting an electron image into an intensified optical image;
   a thin fiber plate for transmitting said intensified optical image; and
   a solid-state image pickup device for producing a video output signal in response to the intensified optical image transmitted from said thin fiber plate.

2. An image pickup device as claimed in claim 1, wherein said image pickup device is sealed using said fiber plate and a package of said solid-state image pickup device.

3. An image pickup device as claimed in claim 1, wherein the thickness of said thin fiber plate is within the range of 0.5–1.5 mm.

4. An image pickup device as claimed in claim 1, further comprising means for accelerating said photoelectrons towards said phosphor layer.

5. An image pickup device as claimed in claim 4, wherein said photoelectrons are accelerated in a proximity-focused condition.

6. An image pickup device as claimed in claim 1, wherein said fluorescent screen section further comprises a metal-back layer formed on said phosphor layer.

7. An image pickup device as claimed in claim 6, wherein said fluorescent screen section further comprises an anti-reflection layer formed on said metal-back layer.

8. An image pickup device as claimed in claim 1, further comprising a microchannel plate disposed between said photocathode and said phosphor layer, for multiplying said photoelectrons.

9. An image pickup device as claimed in claim 1, wherein said solid-state image pickup device comprises a solid-state device having a scanning function, and a layered photoconductive material superimposed on the solid-state device.

10. An image pickup device as claimed in claim 1, wherein said fluorescent screen section further comprises an optical filter layer disposed between said phosphor layer and said thin fiber plate, for matching emission spectrum characteristics of said phosphor layer and spectrum characteristics of a photosensitive layer of said image pickup device.

* * * * *